(12) United States Patent
Nohta et al.

(10) Patent No.: US 8,873,186 B2
(45) Date of Patent: Oct. 28, 2014

(54) TAPE STORAGE DEVICE

(71) Applicant: International Business Machines Corporation, Armonk, NY (US)

(72) Inventors: Takeshi Nohta, Tsukuba (JP); Eiji Tosaka, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/734,853

(22) Filed: Jan. 4, 2013

(65) Prior Publication Data

US 2013/0176641 A1     Jul. 11, 2013

(30) Foreign Application Priority Data

Jan. 5, 2012  (JP) ................................ 2012-000308

(51) Int. Cl.
    *G11B 19/04*       (2006.01)
(52) U.S. Cl.
    CPC ..................................... *G11B 19/04* (2013.01)
    USPC ......................................................... 360/60
(58) Field of Classification Search
    None
    See application file for complete search history.

(56) References Cited

U.S. PATENT DOCUMENTS

| | | | | |
|---|---|---|---|---|
| 5,485,321 | A  * | 1/1996  | Leonhardt et al. | 360/48 |
| 6,856,479 | B2 * | 2/2005  | Jaquette et al.  | 360/48 |
| 7,236,322 | B2 * | 6/2007  | Greco et al.     | 360/75 |
| 7,350,021 | B2   | 3/2008  | Itagaki et al.   |        |
| 7,631,141 | B2   | 12/2009 | Watanabe         |        |
| 8,477,440 | B2 * | 7/2013  | Itagaki et al.   | 360/15 |
| 8,599,511 | B2 * | 12/2013 | Shiratori et al. | 360/72.1 |

FOREIGN PATENT DOCUMENTS

| | | |
|---|---|---|
| JP | 2004-341925 A | 12/2004 |
| JP | 3870215 B1    | 1/2007  |

* cited by examiner

*Primary Examiner* — K. Wong
(74) *Attorney, Agent, or Firm* — Zilka-Kotab, PC

(57) ABSTRACT

A method, and tape storage device configured to perform such method, according to various embodiments, includes writing data stored in a buffer onto a tape; writing an interval marker on the tape after the data stored in the buffer is written onto the tape; writing next data subsequent to the interval marker when the next data is stored in the buffer in a first round corresponding to a first-time write in a single track in the tape; writing data stored in the buffer in an area of the interval marker in a second round corresponding to a second-time write in the single track; and writing data stored in the buffer in an area of the interval marker in which no data is written in each of third and subsequent rounds corresponding to third- and subsequent-time writes in the single track.

20 Claims, 6 Drawing Sheets

TAPE STORAGE DEVICE

RELATED APPLICATIONS

This application claims priority to Japanese Patent Application No. 2012-000308, filed Jan. 5, 2012, which is herein incorporated by reference.

BACKGROUND

The present invention relates to a tape storage device, and more specifically, it relates to data writing control for a tape storage device.

Existing tape storage devices are based on the premise that, in recording data from a host on tape, items of data are sequentially recorded in a data track. If the amount of data input from a host per unit time is smaller than the amount of data written on tape, the tape transportation is stopped and the tape is rewound (back hitched), or alternatively, the tape transportation speed is reduced and items of data are sequentially recorded in a data track densely.

BRIEF SUMMARY

A device according to one embodiment includes a controller configured to perform control for: (i) writing data stored in a buffer, subsequently writing an interval marker without interruption after the buffer is empty of the stored data, and writing next data subsequently to the interval marker when the next data is stored in the buffer in a first round corresponding to a first-time write in a single track in a tape, (ii) writing data stored in the buffer in an area of the interval marker in a second round corresponding to a second-time write in the single track, and (iii) writing data stored in the buffer in the area in which no data is written of the interval marker in each of third and subsequent rounds corresponding to third- and subsequent-time writes in the single track.

A method according to one embodiment includes writing data stored in a buffer onto a tape; writing an interval marker on the tape after the data stored in the buffer is written onto the tape; writing next data subsequent to the interval marker when the next data is stored in the buffer in a first round corresponding to a first-time write in a single track in the tape; writing data stored in the buffer in an area of the interval marker in a second round corresponding to a second-time write in the single track; and writing data stored in the buffer in an area of the interval marker in which no data is written in each of third and subsequent rounds corresponding to third- and subsequent-time writes in the single track.

A computer program product may include program code readable/executable by a controller to perform some or all of the foregoing method.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of tape storage devices, as well as operation and/or component parts thereof.

In one general embodiment, a device includes a controller, such as a tape storage chip, board, and/or circuit, configured to perform control for: (i) writing the data stored in the buffer, subsequently writing an interval marker without interruption after the buffer is empty of the stored data, and writing next data subsequently to the interval marker when the next data is stored in the buffer in a first round corresponding to a first-time write in a single track in the tape, (ii) writing data stored in the buffer in an area of the interval marker in a second round corresponding to a second-time write in the single track, and (iii) writing data stored in the buffer in the area in which no data is written of the interval marker in each of third and subsequent rounds corresponding to third- and subsequent-time writes in the single track.

In another general embodiment, a method includes writing data stored in a buffer onto a tape; writing an interval marker on the tape after the data stored in the buffer is written onto the tape; writing next data subsequent to the interval marker when the next data is stored in the buffer in a first round corresponding to a first-time write in a single track in the tape; writing data stored in the buffer in an area of the interval marker in a second round corresponding to a second-time write in the single track; and writing data stored in the buffer in an area of the interval marker in which no data is written in each of third and subsequent rounds corresponding to third- and subsequent-time writes in the single track.

Back hitching or variable-speed tape transportation to sequentially record items of data on a data track typically needs a mechanism for minutely controlling a reel motor, e.g. a mechanism for controlling a tape transportation speed in several steps or steplessly. Accordingly, various embodiments of the present invention provide data writing control by which complex control of tape transportation, movement of the position of a read-and-write (R/W) head, or other intricate control in the above-described technique may be eliminated or reduced in data writing in a tape storage device.

Several preferred embodiments of the present invention provide a tape storage device including a read-and-write (R/W) head capable of writing data after reading data, a buffer configured to store data to be written on tape and data read from the tape by the R/W head, a motor driver configured to control a motor for transporting the tape, and a controller configured to control the R/W head and the motor driver. Preferably, after instructing the motor driver to transport the tape at a constant speed, the controller in the tape storage device may perform control for (i) writing the data stored in the buffer, subsequently writing an interval marker without interruption after the buffer is empty of the stored data, and writing next data subsequently to the interval marker when the next data is stored in the buffer in a first round corresponding to a first-time write in a single track in the tape, (ii) writing data stored in the buffer in an area of the interval marker in a second round corresponding to a second-time write in the single track, and (iii) writing data stored in the buffer in the area in which no data is written of the interval marker in each of third and subsequent rounds corresponding to third- and subsequent-time writes in the single track.

In some embodiments of the present invention, because data may be written while the tape is transported at a constant speed, complex control of tape transportation, such as back hitching and variable-speed tape transportation, may be avoided. In addition, production of an interval marker in the same track in the tape and use of the interval marker (a plurality of writes in the interval marker) may prevent a decrease in the amount of stored data (density) per one track.

According to one embodiment, a controller may perform control for writing the data stored in the buffer in the area of the interval marker when a data fill ratio (e.g. the amount of written data in one track/capacity of one track) for the single track does not exceed a predetermined value. Additionally, an overflow in writing data in the single track may be avoided, and, substantially the same or similar amount of writing data may be ensured in each track.

According to another embodiment, the controller may perform control for writing the data stored in the buffer in a next new track when the data fill ratio for the single track exceeds the predetermined value. Furthermore, complex control for movement of the position of the head may be avoided.

According to yet another embodiment, the controller may update the data fill ratio for the single track in an end or a beginning of the single track. In some approaches, a track in which data is to be written may be appropriately selected while, at the same time or near the same time, the latest data fill ratio for the track may be grasped before a write in each round.

According to a further embodiment, the controller may perform control for retaining the data fill ratio for the single track in either one or both of a housekeeping area in the single track or another track in the tape and a cartridge memory of a cartridge holding the tape. In some approaches, storing the data fill ratio for the single track in the tape or the cartridge itself may enable writing control using this data fill ratio in different (other) tape storage devices.

According to various embodiments, the data may be written in the area of the interval marker by the R/W head after a predetermined time since a beginning of the interval marker in the area of the interval marker is read by the R/W head. In addition, data may be automatically written (overwritten) in the area of the interval marker simply by detection (reading) of this interval marker.

According to some approaches, when the predetermined time is T, T may be expressed by the following equation:

$$T = L/V(s)$$

where L denotes a distance (m) between a write (W) head and a read (R) head in the R/W head and V denotes a transportation speed (m/s) of the tape. The time (position) to start writing data may also be appropriately and precisely set from detection (reading) of the interval marker.

Figure 1:
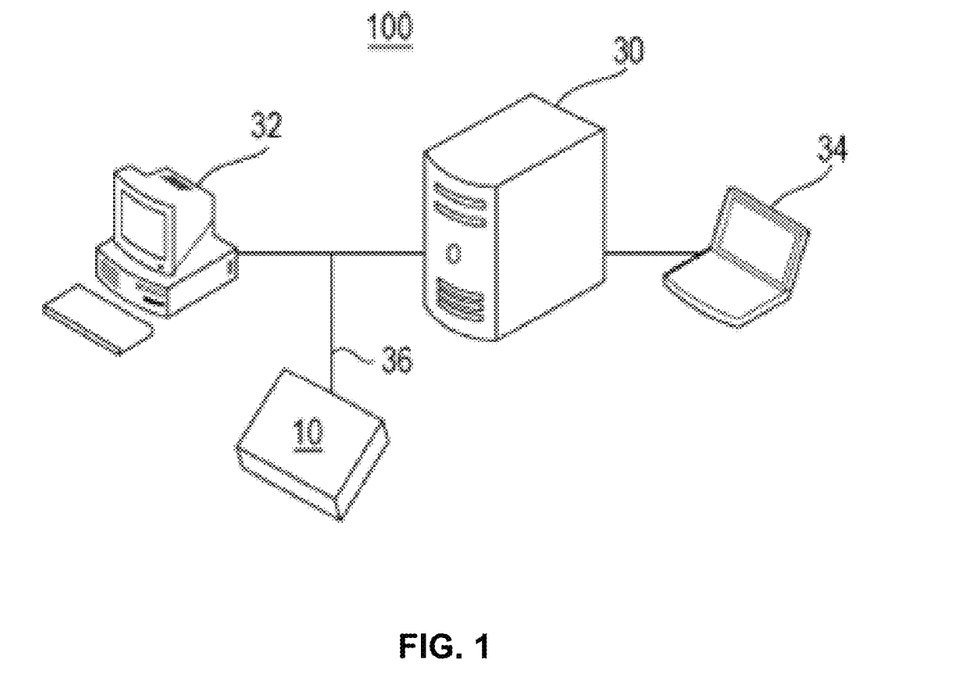
FIG. 1 depicts a schematic diagram of a of a file system that uses a tape storage device according to one embodiment.

Referring now to FIG. 1, a schematic diagram of a file system that may use a tape storage device is shown according to one illustrative embodiment. A file system 100 includes a tape storage device 10, a host (e.g. a server) 30, and user devices 32 and 34. Such user devices may include, but are not limited to personal computers (PCs), terminals, desktop computers, handheld computers, etc or any other type of logic. The tape storage device 10, host (server) 30, and user devices 32 and 34 are connected to each other over a network 36 such that they can communicate with each other. FIG. 1 depicts one tape storage device 10 and one host (server) 30 for illustrative purposes only. Obviously, the file system 100 may include two or more tape storage devices 10 and hosts (servers) 30. The tape storage device according to the present invention is not limited to being used as part of the file system 100 and may also be used in any form where it can be connected to the host (server) 30 and user devices 32 and 34.

Figure 2:
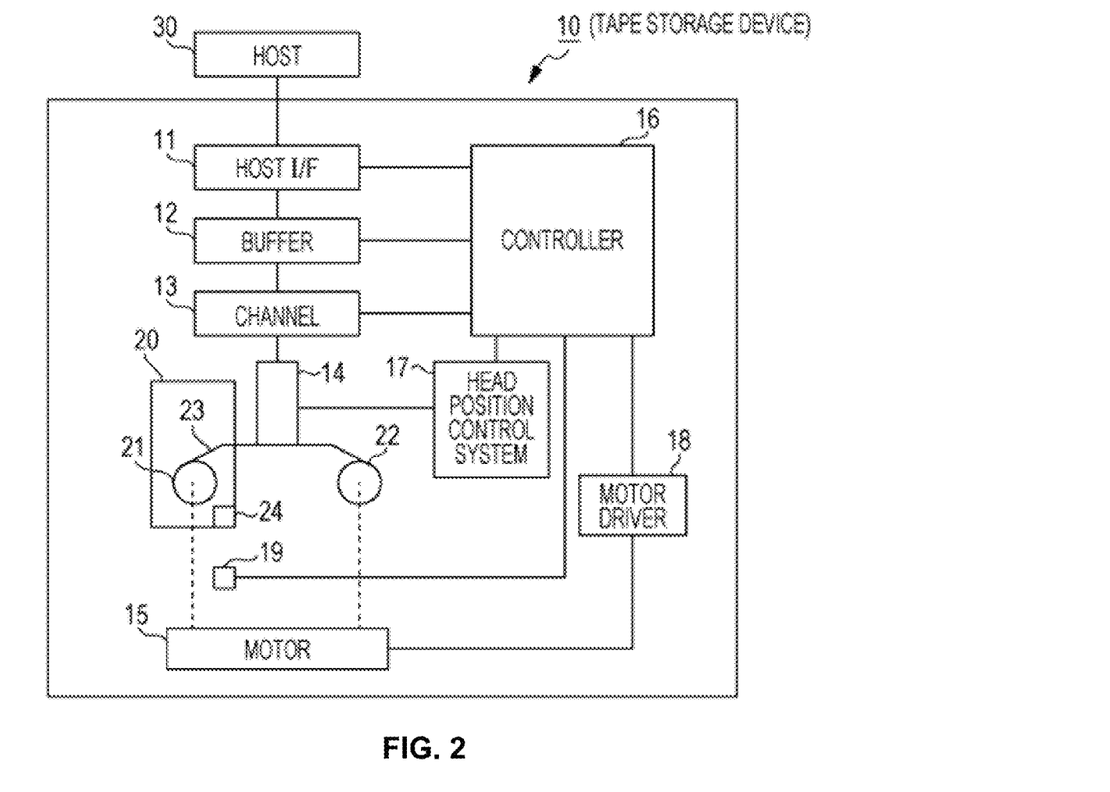
FIG. 2 depicts a schematic diagram of a tape storage device according to one embodiment.

FIG. 2 illustrates a schematic diagram of a tape storage device 10 according to another illustrative embodiment. The tape storage device 10 includes a host interface (hereinafter referred to as "host I/F") 11, a buffer 12, a channel 13, a read-and-write (R/W) head 14, and a motor 15. The tape storage device 10 further includes a controller 16, a head position control system 17, and a motor driver 18. A tape cartridge 20 may be loaded in the tape storage device 10 by being inserted therein as also shown in FIG. 2. The tape cartridge 20 includes tape 23 wound on reels 21 and 22. Together with rotation of the reels 21 and 22, the tape 23 longitudinally moves in the direction from the reel 21 to reel 22 or the direction from the reel 22 to the reel 21. In some approaches, tape 23 may be magnetic tape or other suitable tape medium as understood by one having skill in the art upon reading the present disclosure.

As shown in FIG. 2, the tape cartridge 20 also includes a cartridge memory (CM) 24. The CM 24 records information indicating how data is written on the tape 23. The data may be accessed at high speed by, for example, consulting an index of the data written on the tape 23, status of use of the tape 23, and the like, by the use of an RF interface in a noncontact manner. The CM 24 may also record a data fill ratio (e.g. the amount of written data/capacity of one track) for each track in the tape. The data fill ratio is used in data writing control for each track described below. The interface used in accessing the CM 24, such as the RF interface, is represented as a cartridge memory interface (hereinafter referred to as "CM I/F") 19 in FIG. 2.

The host I/F 11 communicates with the host (server) 30, the user device 32, and other apparatuses. For example, the host I/F 11 receives, from the OS in the host 30, a command to write data on the tape 23, a command to move the tape 23 to a target position, and a command to read data from the tape 23. In the exemplary schematic diagram illustrated in FIG. 1 described above, data in the tape storage device may be directly referred to from the OS in a desktop computer, and the data can be executed by double clicking and can be copied by drag-and-drop, as in the case of handling a file in a hard disk.

With the continued reference to FIG. 2, the buffer 12 may be a memory that stores data to be written on the tape 23 and data read from the tape 23. For example, the buffer 12 may be a dynamic random access memory (DRAM). The buffer 12 may include a plurality of buffer segments, each of which stores a data set that is a unit for reading and writing data from and on the tape 23. The channel 13 may be a communication path for use in transmitting data to be written on the tape 23 to the R/W head 14 and in receiving data read from the tape 23 from the R/W head 14.

The R/W head 14 writes information on the tape 23 and reads information from the tape 23 while the tape 23 moves in the longitudinal direction. Although FIG. 2 depicts only one R/W head 14, in some embodiments there may be two or more R/W heads 14, one for the forward direction of movement of the tape 23 and the other for the backward direction thereof. The details of the R/W head 14 are described below.

As shown in FIG. 2, the motor 15 rotates the reels 21 and 22. The motor 15 is depicted as a single rectangle in FIG. 2; however, in preferred embodiments, two motors 15, one for each of the reels 21 and 22, may be provided.

The controller 16 exercises control over the tape storage device 10. For example, the controller 16 may control writing data on the tape 23 and reading data from the tape 23 in accordance with a command received by the host I/F 11. The controller 16 may also control the head position control system 17 and the motor driver 18. The data writing control performed by the controller 16 is described below.

As also shown in FIG. 2, the head position control system 17 may be a system that keeps track of a desired lap. The lap used herein may indicate a group of a plurality of tracks on the tape 23. If it become necessary to switch a lap, it may also become necessary to electrically switch the head 14. This kind of switching control may be performed by the head position control system 17.

The motor driver 18 drives the motor 15. As previously described, if two motors 15 are used, two motor drivers 18 may be provided. The CM I/F 19 may be achieved by an RF reader-writer, for example, and writes information in the CM 24 and reads information from the CM 24.

Figure 3A:
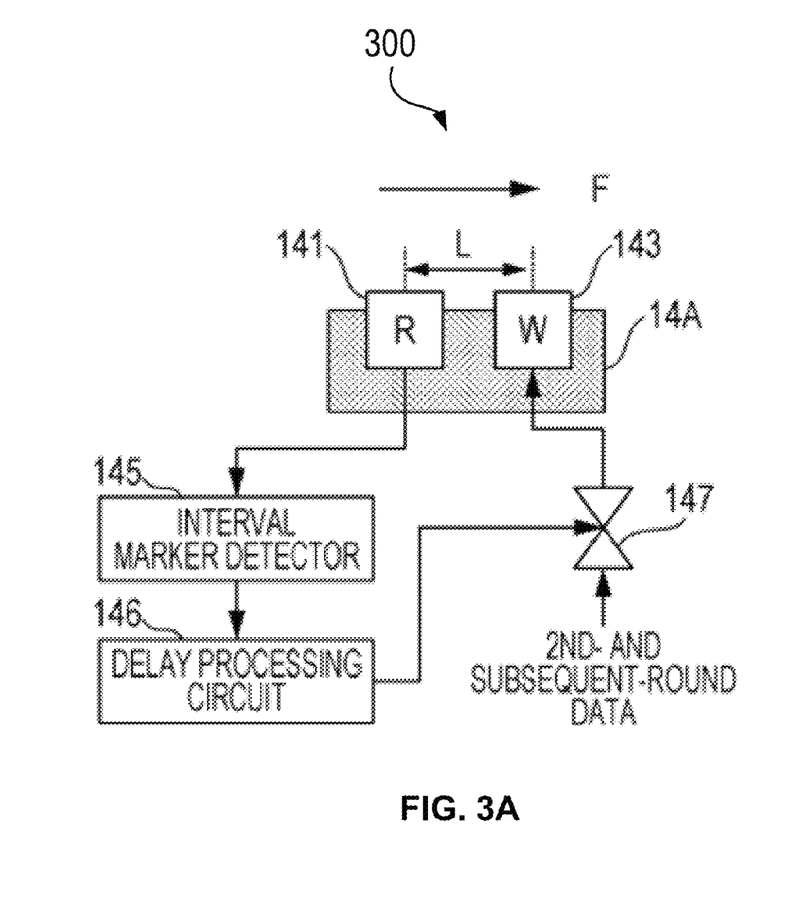
FIGS. 3A-3B depict schematic diagrams of a read-and-write (R/W) head and its peripheral circuit according various embodiments.
Figure 3B:
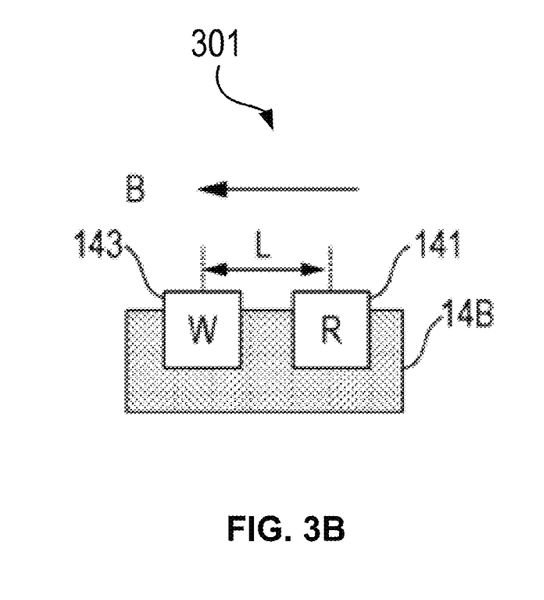

Referring now to FIGS. 3A-3B, schematic diagrams 300, 301 of a R/W head and its peripheral circuits are shown according to illustrative embodiments. FIG. 3A illustrates an R/W head 14A used when the tape 23 is transported in the forward direction (direction indicated by the arrow F) and FIG. 3B illustrates an R/W head 14B used when the tape 23 is transported in the backward direction (direction indicated by the arrow B). Only the head section is illustrated in FIG. 3B, and the peripheral circuit is omitted in FIG. 3B because it is the same as in FIG. 3A. Each of the R/W heads 14A and 14B includes at least one read (R) head 141 and one write (W) head 143. The read (R) head 141 is located to the left of the write (W) head 143 in FIG. 3A. However, as shown in FIG. 3B, the read (R) head 141 is located to the right of the write (W) head 143. The reason why the arrangements in FIGS. 3A and 3B are different is that data is written after the read (R) head, which is positioned in advance of the write (W) head in the respective tape travel directions shown, detects (reads) the area of an interval marker, as described in more detail below, in a track of the tape in the forward transportation direction (direction indicated by the arrow F in FIG. 3A) and the backward transportation direction (direction indicated by the arrow B in FIG. 3B). The read (R) head 141 is spaced away from the write (W) head 143 by a predetermined distance L. If the tape storage device includes a mechanism for reversing the direction of the R/W head in synchronization with a reversal of the direction of transportation of the tape (F→B or B→F), the R/W head may be either one of the R/W heads 14A and 14B.

An interval marker detector 145 illustrated in FIG. 3A detects an interval marker from a signal (information) read by the read head 141. The interval marker used herein may be information that indicates vacancy and may be different from a user data set. One example of the interval marker may be a data set separator. The interval marker may also include a predetermined pattern in some approaches. The interval marker detector 145 may detect the interval marker by reading the predetermined pattern included in the interval marker.

In response to a detection signal from the interval marker detector 145, a delay processing circuit 146 may send a delay signal subjected to a delay of a predetermined time to a gate circuit 147. The predetermined time may be set in the way described below. For example, when the predetermined time is T(s), T may be set in various approaches as follows:

$$T = L/V(s) \tag{1}$$

where L denotes the distance (m) between the write (W) head 143 and the read (R) head 141 in the R/W head and V denotes the transportation speed (m/s) of the tape.

The predetermined time may be set in this way because the data writing control in the present invention may be performed based on the premise that the tape is transported at a constant speed, as described below. Thus, the time (position) to start writing data in the area of an interval marker may be appropriately and precisely set from detection (reading) of this interval marker.

In response to the delay signal from the delay processing circuit 146, the gate circuit 147 may perform control for sending data stored in the buffer 12 to the write (W) head 143 in writes in a single track in the tape in the second and subsequent rounds, according to some approaches. Write data in the second and subsequent rounds may be sent to the write (W) head 143 through the channel 13 in more approaches.

According to various embodiments, the writing control performed by the controller 16 (shown, e.g. in FIG. 2) may be described with reference to FIGS. 4A-4D and FIG. 5. For instance, FIGS. 4A-4D illustrate exemplary schematic diagrams 400 of states of writing in the forward direction (direction indicated by the arrow F) and in the backward direction (direction indicated by the arrow B) of the tape. In writing in the forward (F) direction in FIGS. 4A-4D, the R/W head 14A illustrated in FIG. 3A described above may be used; in writing in the backward (B) direction, the R/W head 14B illustrated in FIG. 3B may be used. In FIGS. 4A-4D, the tape 23 may be transported at a constant speed in both the forward direction and backward direction by control on the motor driver 18 by the controller 16. Additionally, FIGS. 5A-5B illustrate schematic diagrams 500, 501 of positional relationships between the R/W head and the tape according to the present invention.

Figure 4A:
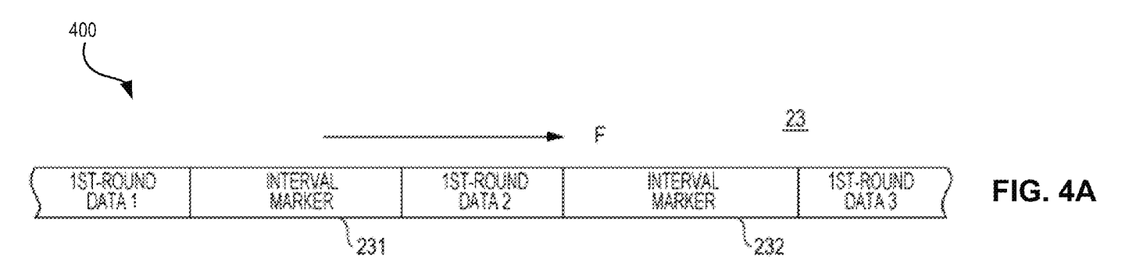
FIGS. 4A-4D depict schematic diagrams of states of writing in a portion of a tape according to various embodiments.
Figure 4B:
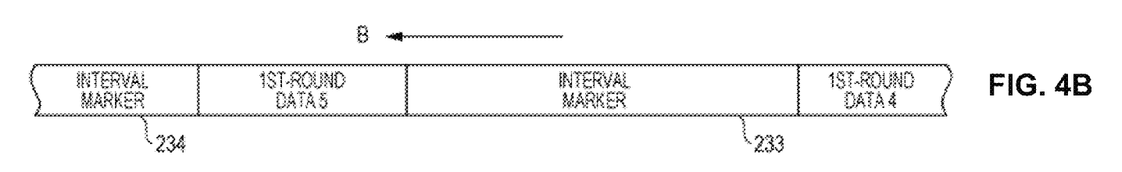
Figure 4C:
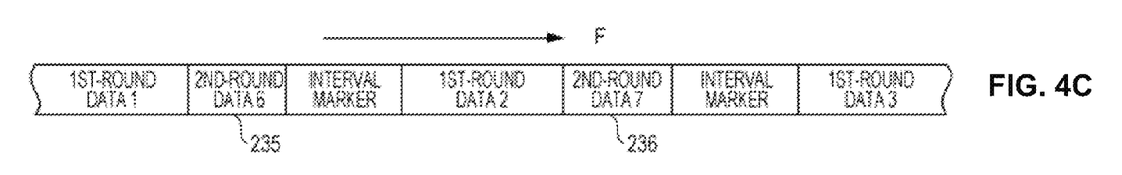
Figure 4D:
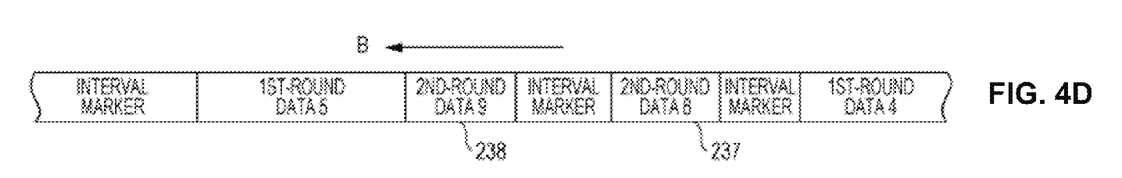
Figure 5A:
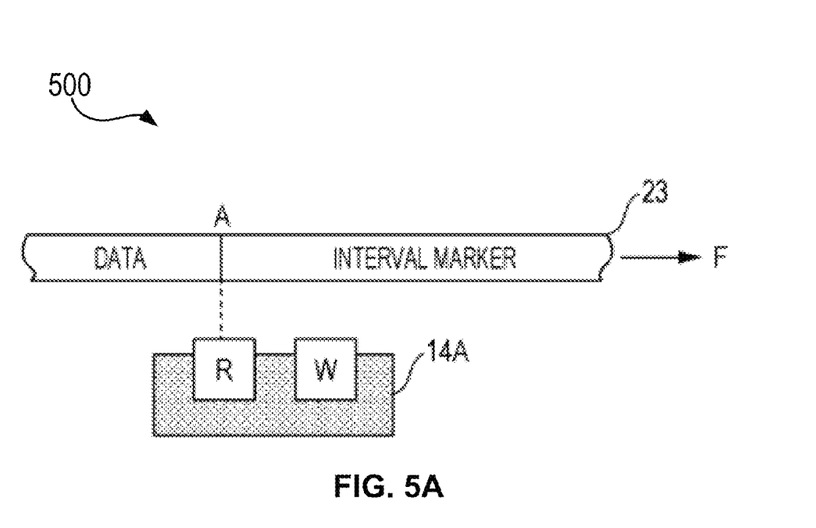
FIGS. 5A-5B depict schematic diagrams of positional relationships between a R/W head and a tape according to one embodiment.
Figure 5B:
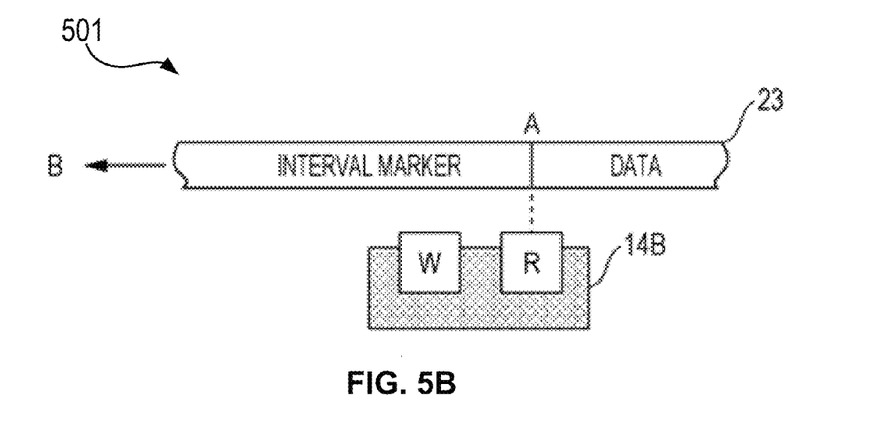

Referring first to FIGS. 4A to 4D in sequence, FIG. 4A illustrates an example of writing in a first track in the first round in the forward direction; FIG. 4B illustrates an example of writing in a second track adjacent to the first track in the first round in the backward direction; FIG. 4C illustrates an example of writing in the first track in the second round in the forward direction; and FIG. 4D illustrates an example of writing in the second track in the second round in the backward direction. In some approaches, writes on the tape 23 in the same direction may be counted as the first round, second round, . . . in sequence. Accordingly, FIG. 4A may correspond to writing in the first round in the forward direction; FIG. 4C may correspond to writing in the second round in the forward direction; FIG. 4B may correspond to writing in the first round in the backward direction; and FIG. 4D may correspond to writing in the second round in the backward direction.

As shown in FIG. 4A according to one embodiment, after the buffer 12 (FIG. 2) is empty of data after first-round data 1 from the buffer 12 is written, an interval marker 231 may be subsequently written in the first track without interruption. When data from the host 30 is stored in the buffer 12, this data may be written as first-round data 2 after the interval marker 231. After the buffer 12 is empty of data again, an interval marker 232 may subsequently be written without interruption. When data from the host 30 is stored in the buffer 12, this data may be written as first-round data 3 after the interval marker 232. Such a writing operation may be repeated from the beginning (BOT) to the end (EOT) of the tape 23.

When the end of the first track in the first round (EOT of the tape) is reached in FIG. 4A, the controller 16 (FIG. 2) may temporarily stop the transportation of the tape in some approaches. The controller 16 may perform control for calculating the data fill ratio (e.g. the amount of written data/ capacity of one track) for the first track and retaining the data fill ratio in either one or both of a housekeeping area (not illustrated) in that track or another track and the CM 24 (FIG. 2). The controller 16 may also determine whether the data fill ratio for the first track does not exceed a predetermined value. Examples of the predetermined value may include about 50%, about 80%, about 90%, etc. The predetermined value may be set at an appropriate value as a reference value for determining whether further data is to be written in that track.

In various approaches, the controller 16 (FIG. 2) may control the head position control system 17 so as to start writing data in the adjacent second track in the first round in transportation in the backward direction from the end (EOT) to the beginning (BOT) of the tape 23 by the R/W head 14, as illustrated in FIG. 4B. With regard to writing in the second track (illustrated in FIG. 4B) as a continuation of the writing in the first track (illustrated in FIG. 4A), after the buffer 12 is empty of data after first-round data 4 from the buffer 12 is written, an interval marker 233 may be subsequently written in the second track without interruption. Further, when data from the host 30 is stored in the buffer 12, this data may be written as first-round data 5 after the interval marker 233. After the buffer 12 is empty of data again, an interval marker 234 may be subsequently written without interruption. Such a writing operation may be repeated from the end (EOT) to the beginning (BOP) of the tape 23.

In more approaches, when the end of the second track in the first round (BOT of the tape) is reached in FIG. 4B, the controller 16 (FIG. 2) may temporarily stop the transportation of the tape, calculate the data fill ratio for the second track, retain the data fill ratio, and determine whether the data fill ratio does not exceed a predetermined value by comparing it against a predetermined value, as in the case of FIG. 4A discussed above.

When the data fill ratio for the first track does not exceed the predetermined value, the controller 16 may write data in the first track in the second round, as illustrated in FIG. 4C according to various approaches. When the data fill ratio for the first track exceeds the predetermined value, further writing data in the first track may be canceled, and writing may move to another new track. For instance, FIG. 4C illustrates an example of writing in which second-round data 6 (235) and second-round data 7 (236) are sequentially written in the areas 231 and 232 of the interval markers, respectively. In this writing, as previously described with reference to FIGS. 3A-3B, while interval markers may be detected by the interval marker detector 145, items of data may be sequentially written after a predetermined time since each of the detections. Consequently some embodiments of the present invention feature writing data while determining the data fill ratio for each track and in addition while detecting the area of an interval marker in each track.

Further, according to some approaches, when the end of the first track in the second round (EOT of the tape) is reached in FIG. 4C, the controller 16 may temporarily stop the transportation of the tape, calculate the data fill ratio for the first track, retain (update) the data fill ratio, and determine whether the data fill ratio does not exceed a predetermined value by comparing it against the predetermined value, as in the case of FIG. 4A.

When the data fill ratio for the second track does not exceed the predetermined value, the controller 16 may write data in the second track in the second round, as illustrated in FIG. 4D according some approaches. When the data fill ratio for the second track exceeds the predetermined value, further writing data in the second track may be canceled, and writing may move to another new track in other approaches. FIG. 4D illustrates an example of writing in which second-round data 8 (237) and second-round data 9 (238) may be sequentially written in the area 233 of the interval marker.

In additional approaches, when the end of the second track in the second round (BOT of the tape) is reached in FIG. 4D, the controller 16 may temporarily stop the transportation of the tape, calculate the data fill ratio for the second track, retain (update) the data fill ratio, and determine whether the data fill ratio does not exceed a predetermined value by comparing it against a predetermined value, as in the case of FIG. 4A. Data may be written in the first and second tracks in the third and subsequent rounds using substantially the same or similar procedure as in the case of FIG. 4C or 4D. Such writing control by the controller 16 may be performed on each track successively in substantially the same way.

Referring now to FIG. 5A, a schematic diagram 500 of a positional relationship between the R/W head 14A and the tape 23 in detecting an interval marker in transportation in the forward direction (F direction) is shown according to another illustrative embodiment. The interval marker may first be read by the read (R) head of the R/W head 14A in this transportation in the forward direction, as illustrated. Data may be written (overwritten) by the write (W) head in the read interval marker (area), as illustrated in the example of FIG. 4C. In a location where no interval marker is detected by the interval marker detector 145, in other words, in a location where no interval marker is read by the read (R) head, writing data by the write (W) head may be stopped in some approaches. The point A is the end point of reading the interval marker in FIG. 5A, and writing data may be stopped in response to the detection of this end point (point A).

Referring now to FIG. 5B, a schematic diagram 501 of a positional relationship between the R/W head 14B and the tape 23 in detecting an interval marker in transportation in the backward direction (B direction) is shown according to yet another embodiment. The interval marker may be read by the read (R) head of the R/W head 14B in this transportation in the backward direction, as illustrated. Data may be written (overwritten) by the write (W) head in the read interval marker (area), as illustrated in the example of FIG. 4D. In a location where no interval marker is read by the read (R) head, writing data by the write (W) head may stopped in some approaches, as in the case of FIG. 5A.

Figure 6:
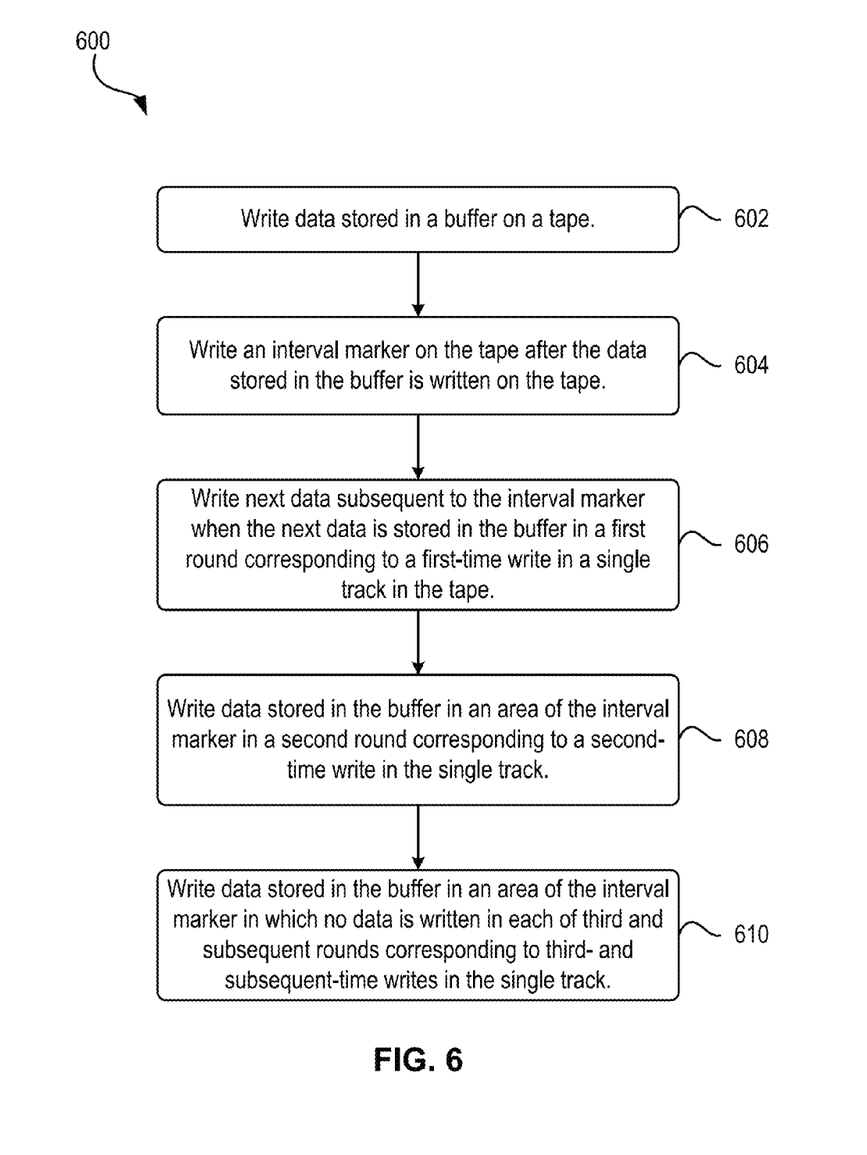
FIG. 6 depicts a flowchart of a method according to one embodiment.

Now referring to FIG. 6, a method 600 is shown in accordance with one embodiment. As an option, the present method 600 may be implemented in conjunction with features from other embodiments listed herein, such as those described with reference to the other FIGS. Of course, however, such method 600 and others presented herein may be used in various applications and/or permutations, which may or not be specifically described in the illustrative embodiments listed herein. Moreover, more or less operations than those shown in FIG. 6 may be included in method 600, according to various embodiments.

As shown in FIG. 6 according to one approach, the method 600 includes writing data stored in a buffer on a tape) and writing an interval marker on the tape after the data stored in the buffer is written on the tape. See operations 602 and 604, respectively. The method 600 also includes writing next data subsequent to the interval marker when the next data is stored in the buffer in a first round corresponding to a first-time write in a single track in the tape. See operation 606.

Further, in operation 608, data stored in the buffer is written in an area of the interval marker in a second round corresponding to a second-time write in the single track. In one embodiment, the data stored in the buffer is written in the area of the interval marker by the R/W head after a predetermined time since a beginning of the interval marker in the area of the interval marker is read by the R/W head. As used herein, the predetermined time (T) may be expressed by the following equation:

$$T=L/V(s)$$

where L denotes a distance (m) between a write (W) head and a read (R) head in the R/W head and V denotes a transportation speed (m/s) of the tape.

Additionally, data stored in the buffer is written in an area of the interval marker in which no data is written, in each of third and subsequent rounds corresponding to third- and subsequent-time writes in the single track. See operation 610.

According to one embodiment, the method 600 may further include determining a data fill ratio for the single track, wherein the data fill ratio refers to an amount of written data on a single track divided by a capacity of the single track. In some approaches, the data fill ratio for the single track may be updated in an end of the single track or a beginning of the single track. In other approaches, the data fill ratio for the single track may be retained in at least one of a housekeeping area in the single track or another track in the tape and a cartridge memory of a cartridge holding the tape.

According to another embodiment, the data stored in the buffer in the area of the interval marker may be written when the data fill ratio for the single track does not exceed the predetermined value. According to yet another embodiment, the data stored in the buffer may be written in another track when the data fill ratio for the single track exceeds the predetermined value.

Numerous embodiments of the present invention have been described with reference to the drawings. It should be understood, however, that the present invention is not limited to the above-described embodiments. For instance, the present invention may be used in various applications and/or permutations, which may or not be specifically described in the illustrative embodiments listed herein. Moreover, any of the features presented herein may be combined in any combination to create various embodiments, any of which fall within the scope of the present invention.

It will be clear that the various features of the foregoing systems and/or methodologies may be combined in any way, creating a plurality of combinations from the descriptions presented above.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (e.g., CD-ROM), a Blu-ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fibre, etc.

Program code embodied on a computer readable medium may be transmitted using any appropriate medium, including but not limited to wireless, wireline, optical fibre cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer, for example through the Internet using an Internet Service Provider (ISP).

Aspects of the present invention are described herein with reference to flowchart illustrations and/or block diagrams of methods, apparatus (systems) and computer program products according to embodiments of the invention. It will be understood that each block of the flowchart illustrations and/ or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart(s) and/or block diagram block or blocks.

It will be further appreciated that embodiments of the present invention may be provided in the form of a service deployed on behalf of a customer.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A device comprising:
   a controller configured to perform control for:
   (i) writing data stored in a buffer, subsequently writing an interval marker without interruption after the buffer is empty of the stored data, and writing next data subsequently to the interval marker when the next data is stored in the buffer in a first round corresponding to a first-time write in a single track in a tape,
   (ii) writing data stored in the buffer in an area of the interval marker in a second round corresponding to a second-time write in the single track, and
   (iii) writing data stored in the buffer in the area in which no data is written of the interval marker in each of third and subsequent rounds corresponding to third- and subsequent-time writes in the single track.

2. The device according to claim 1, wherein the controller performs control for writing the data stored in the buffer in the area of the interval marker when a data fill ratio for the single track does not exceed a predetermined value, wherein the data fill ratio refers to an amount of written data on the single track divided by a capacity of the single track.

3. The device according to claim 2, wherein the controller performs control for writing the data stored in the buffer in another track when the data fill ratio for the single track exceeds the predetermined value.

4. The device according to claim 2, wherein the controller updates the data fill ratio for the single track in an end or a beginning of the single track.

5. The device according to claim 4, wherein the controller performs control for retaining the data fill ratio for the single track in at least one of a housekeeping area in the single track or another track in the tape and a cartridge memory of a cartridge holding the tape.

6. The device according to claim 1, wherein the data is written in the area of the interval marker by a R/W head after a predetermined time has elapsed from when a beginning of the interval marker in the area of the interval marker is read by the R/W head.

7. The device according to claim 6, wherein when the predetermined time (T) is expressed by the following equation:

$$T=L/V(s)$$

where L denotes a distance (in) between a write (W) head and a read (R) head in the R/W head and V denotes a transportation speed (m/s) of the tape.

8. The device according to claim 1, further comprising:
   a read-and-write (R/W) head capable of writing data after reading data;
   a buffer configured to store data to be written on a tape and data read from the tape by the R/W head; and
   a motor driver configured to control a motor for transporting the tape.

9. A method comprising:
   writing data stored in a buffer onto a tape;
   writing an interval marker on the tape after the data stored in the buffer is written onto the tape;
   writing next data subsequent to the interval marker when the next data is stored in the buffer in a first round corresponding to a first-time write in a single track in the tape;
   writing data stored in the buffer in an area of the interval marker in a second round corresponding to a second-time write in the single track; and
   writing data stored in the buffer in an area of the interval marker in which no data is written in each of third and subsequent rounds corresponding to third- and subsequent-time writes in the single track.

10. The method of claim 9, wherein the data stored in the buffer is written in the area of the interval marker by the R/W head after a predetermined time has elapsed from when a beginning of the interval marker in the area of the interval marker is read by the R/W head.

11. The method as recited in claim 10, wherein when the predetermined time (T) is expressed by the following equation:

$$T=L/V(s)$$

where L denotes a distance (m) between a write (W) head and a read (R) head in the R/W head and V denotes a transportation speed (m/s) of the tape.

12. The method as recited in claim 9, further comprising determining a data fill ratio for the single track, wherein the data fill ratio refers to an amount of written data on the single track divided by a capacity of the single track.

13. The method as recited in claim 12, further comprising updating the data fill ratio for the single track in an end of the single track or a beginning of the single track.

14. The method as recited in claim 12, further comprising retaining the data fill ratio for the single track in at least one of a housekeeping area in the single track or another track in the tape and a cartridge memory of a cartridge holding the tape.

15. The method as recited in claim 12, further comprising comparing the data fill ratio to a predetermined value.

16. The method as recited in claim 15, wherein the data stored in the buffer is written in the area of the interval marker when the data fill ratio for the single track does not exceed the predetermined value.

17. The method as recited in claim 15, wherein the data stored in the buffer is written in another track when the data fill ratio for the single track exceeds the predetermined value.

18. A computer program product for writing data onto a tape, the computer program product comprising a computer readable storage medium having program code embodied therewith, the program code readable/executable by a controller to:

write, by the controller, data stored in a buffer onto a tape;

write, by the controller, an interval marker on the tape after the data stored in the buffer is written onto the tape;

write, by the controller, next data subsequent to the interval marker when the next data is stored in the buffer in a first round corresponding to a first-time write in a single track in the tape;

write, by the controller, data stored in the buffer in an area of the interval marker in a second round corresponding to a second-time write in the single track; and write, by the controller, data stored in the buffer in an area of the interval marker in which no data is written in each of third and subsequent rounds corresponding to third- and subsequent-time writes in the single track.

19. The computer program product of claim 18, wherein the data stored in the buffer is written in the area of the interval marker by the R/W head after a predetermined time has elapsed from when a beginning of the interval marker in the area of the interval marker is read by the R/W head.

20. The computer program product of claim 18, further comprising program code readable/executable by the controller to determine, by the controller a data fill ratio for the single track, wherein the data fill ratio refers to an amount of written data on the single track divided by a capacity of the single track.

* * * * *